…

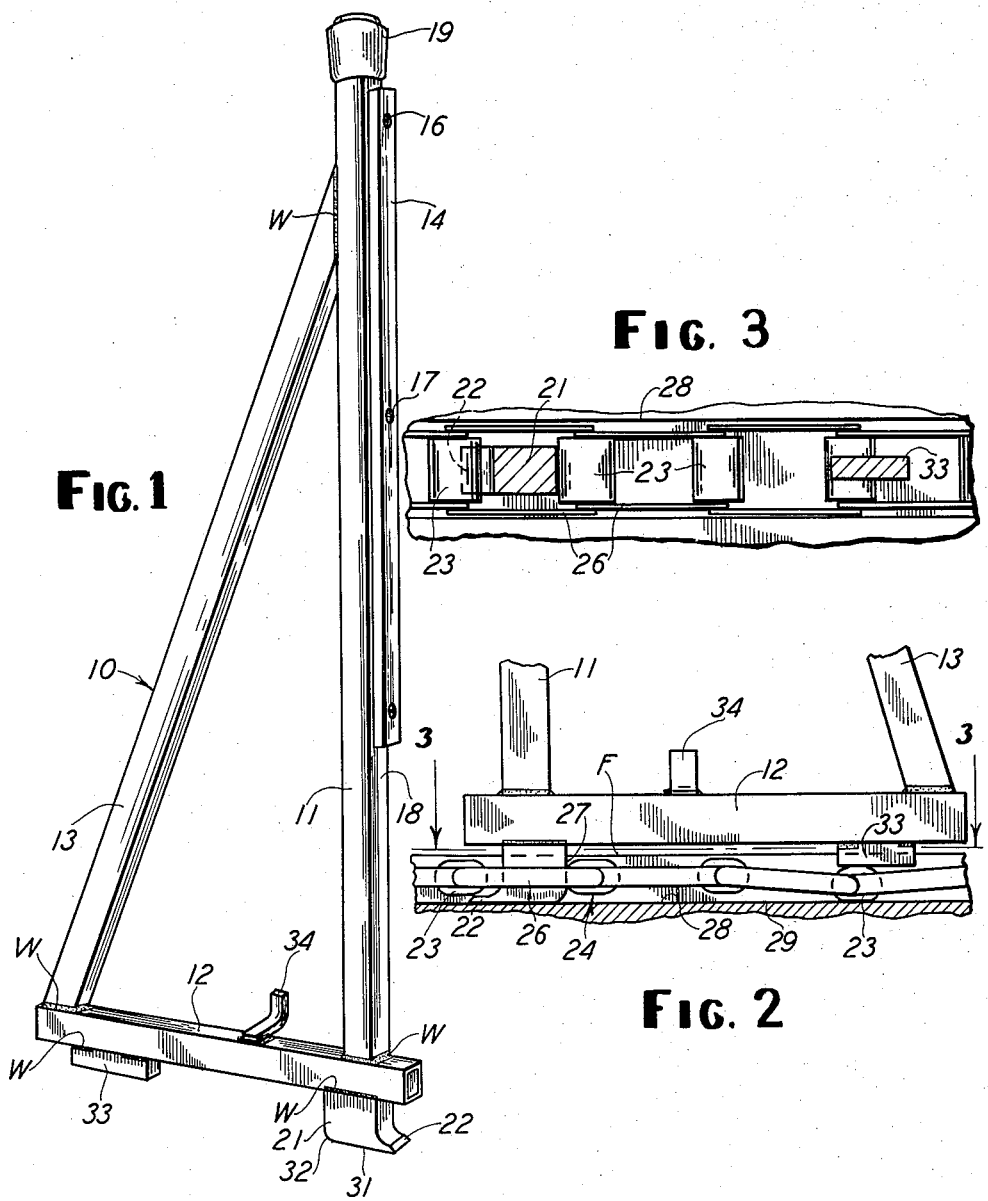

United States Patent Office 3,022,746
Patented Feb. 27, 1962

3,022,746
AUTOMOBILE WASHER PUSHER
Henry Wells, Racine, Wis., assignor to Utility Service Company, Inc., Racine, Wis., a corporation of Wisconsin
Filed Aug. 9, 1960, Ser. No. 48,432
4 Claims. (Cl. 104—172)

This invention relates to a car pusher for use in an automobile washing garage.

In an automobile washing garage, it is customary to drive the automobile to one entrance into the garage and to thereby spot the car with respect to the garage so that the car can be conveyed through the garage and through the various stations of washing including the initial soaping of the car and the final rinsing and drying of the car. To do this, a conveyor chain has been commonly employed and the car front bumper is attached to the chain by means of still another chain connected to the first main chain for the purpose of pulling the car through the wash. This particular method of attaching a chain to the car bumper has not been entirely satisfactory in that in many instances the chain marks the bumper and bends the same where the initial force on the bumper is sufficiently great.

Accordingly, it is an object of this invention to provide a car pusher which can be readily and easily attached to the conveyor chain in the car wash and which will not in any way damage the car.

Another object of this invention is to provide a car pusher which is inexpensive in its manufacture, but yet is sufficiently sturdy to convey the car to the wash without damaging the car and which is not physically attached to the car so that at the end of the conveyor the car pusher does not continue to force against the car, and which can also be readily removed from the conveyor chain and placed on a return conveyor for being again positioned behind a following car.

Other objects and advantages will become apparent upon reading the following description in light of the accompanying drawings wherein:

FIG. 1 is a front perspective view of a preferred embodiment of a pusher of this invention.

FIG. 2 is a side elevational view of a fragment of the pusher shown in FIG. 1 and also showing the conveyor chain related thereto and being somewhat enlarged from FIG. 1.

FIG. 3 is a sectional view taken along the lines 3—3 of FIG. 2.

The same reference numerals refer to the same parts throughout the several views.

The drawings show a preferred embodiment of this car pusher which is generally comprised of a body or frame portion 10 presenting a triangular shape and consisting of a front upright piece 11, a lower horizontal piece 12 and a rear inclined piece 13 all of which are shown to be welded together at the weld areas indicated "W." It will thus be noted that the front piece 11 and the bottom piece 12 form a right angle therebetween so that when the bottom piece 12 is disposed in the horizontal plane along the car wash floor indicated "F" in FIG. 2, the front piece 11 is in a vertical or upright position as desired. At this time it will be noted that the front piece 11 has a rubber bar 14 attached thereto by screws 16 extending through opening 17 in the rubber 14, and the latter therefore covers the front face 18 of the member 11 along the upper end thereof. Thus the bar or pad 14 is disposed forwardly of the pusher 10, and it will be understood that the pad 14 engages the rear bumper of an automobile to push thereon and move the automobile through the car wash. The pad 14, being preferably of a rubber or other resilient and soft material, will not scratch or otherwise damage the car bumper and this is significant when it is understood that the bumper may actually be moving vertically due to either the pressure of the pusher on the bumper or due to other forces acting on the automobile but because of the provision of the pad 14, the rear bumper will not be scratched although it is moving up and down as mentioned. Also, a protective cap 19 is placed over the upper end of the front piece 11 for the purpose of protecting the automobile, and the cap 19 is preferably of a rubber or similar soft material which will not scratch the automobile.

A lug or projection 21 is shown welded at "W" to the bottom member 12 to depend therebelow and present a forwardly projecting toe 22 along the bottom surface of the lug 21. Thus, as shown in FIG. 2, the toe 22 extends below a cross bar 23 of a conveyor chain 24 which also has the usual side links 26 connecting the series of cross bars 23 along the chain. The toe 22 is of a substantial width to be approximately as wide as the cross bar 23 and to thereby be supported by the cross bar 23 to hold the pusher 10 in an erect position and against lateral tipping. The following cross bar 23, which is disposed behind the projection 21, engages the rear surface 27 of the projection 21 to be disposed to push on the projection 21 and thereby provide the contact between the chain 24 and the pusher 10 to move the latter along the floor "F" of the car wash. At this time it will also be noted that the floor "F" is provided with a groove or the like 28 in which the chain 24 is actually disposed as shown and in which the projection 21 is disposed. The base 29 of the groove 28 provides a support on which the bottom 31 of the lug 21 will slide when the chain is moved to the left as viewed in FIG. 2 and of course when it engages the projection 21 as shown to slide the pusher along the floor as mentioned. Because of the provision of the projection 21 and its forwardly projecting toe 22, the pusher 10 can be readily inserted between two cross bars 23 of the chain 24 to be disposed for the pushing action described, and it can also be readily removed from the chain 24, and the inserting and removing action are both accomplished by simply tipping the entire pusher forwardly about the toe 22 for the action desired. Also note that the heel of the projection 21 is curved at 32 to facilitate the inserting and removing of the pusher in the tipping action described so that the projection 21 will readily move past the second or rearwardly disposed cross bar 23 of the chain 24.

To insure that the pusher front member 11 disposed in a vertical and upright position, a block 33 is attached at weld "W" to the rear and lower surface of the member 12 to depend therebelow and engage a subsequent cross bar 23 of the chain 24 and press down thereon as indicated in FIG. 2. This provides for the erect positioning of the pusher 10 and it also takes up some slack in the chain 24, since the chain becomes more taut with the depressing of the cross bar 23 as shown in FIG. 2, and thereby permits better movement of the chain and the pusher. By this arrangement, the body of the pusher 10, particularly the bottom member 12, is spaced above the chain 24 and above the floor "F" but yet the pusher 10 is disposed to have the front member 11 in a vertical position as desired so that the pusher will not be inclined to tilt backwardly and slide below the car rear bumper.

Also, a hook or the like 34 is attached to the bottom member 12 so that the entire pusher 10 can be hooked onto a return conveyor or chain (not shown) which is usually disposed along a wall of this type of car wash and which extends from the exit end of the car wash to the entrance end of the car wash so that the pushers 10 can be returned to the entrance end where they are again needed for conveying the next car through the car wash.

Thus, it will be noted that a relatively inexpensive, but yet entirely safe and sturdy car pusher is provided with a lower projection or lug 21 for engaging the conveyor chain 24 to move the pusher 10 in the car wash and thereby move the car under the power of the chain 24. The projection 21 has the forwardly extending toe 22 which is of a length sufficient to extend under a leading cross bar 23 and which is of a sufficient width to provide stability laterally for the entire pusher 10, and the projection 21 is also of a sufficient length to have it extend rearwardly to the following cross bar 23 where the projection rear surface 27 is contacted by the following cross bar 23 and is pushed thereby.

While a specific embodiment of this invention has been shown and described, it should be obvious that certain changes could be made in the embodiment and the invention should therefore be limited only by the scope of the appended claims.

What is claimed is:

1. An automobile pusher for a car washer or the like having a chain movably disposed along the floor of said washer and including cross bars spaced apart along said chain, comprising a body having a front face disposed in the direction of chain movement and having a bottom portion rigidly disposed with respect to said front face and extending along and resting on said chain, a resilient member attached to said front face of said body and being disposed thereon for pushing on the automobile rear bumper, a projection depending from said bottom portion at the location of the plane of said front face and having a toe portion extending forwardly thereon with respect to said chain movement and extending from the bottom of said projection and being of a forward extent sufficient for being disposed directly underneath and in contact with a first one of said cross bars of said chain for removably attaching said pusher in an upright position on said chain, and said projection being of a length sufficient to extend rearwardly along said chain to abut a second one of said cross bars immediately behind said first one of said cross bars for transmitting the movement of said chain to said pusher.

2. An automobile pusher for a car washer or the like having a chain movably disposed along the floor of said washer and including cross bars spaced apart along said chain, comprising a body having a front face portion and a bottom portion with said portions being rigid with respect to each other and disposed at a right angle to each other, and with said bottom portion extending along and resting on said chain a projection depending from said bottom portion at the end thereof adjacent said face portion and having a toe portion extending forwardly thereon with respect to said chain movement and extending from the bottom of said projection and being of a forward extent sufficient for being disposed underneath a first one of said cross bars of said chain to underlie the same for removably attaching said pusher in an upright position on said chain and said projection being of a length sufficient to extend rearwardly along said chain from said first one of said cross bars to abut a second one of said cross bars immediately behind said first one of said cross bars for transmitting the movement of said chain to said pusher.

3. An automobile pusher for a car washer or the like having a conveyor chain movably disposed along the floor of said washer and including cross bars spaced apart along said chain, comprising a triangularly shaped rigid body mountable on said chain and including an upright portion forwardly disposed in the direction of chain movement and having a bottom portion disposed at a right angle to said upright portion at the junction therebetween and being disposable along and on top of said chain, a resilient member attached to said upright portion of said body and being disposed thereon for pushing on the automobile rear bumper, a projection depending from said bottom portion in a position at least approximately directly below said junction and having a toe portion extending forwardly of said projection with respect to said chain movement and extending from the bottom of said projection and being of a forward extent sufficient for being disposed underneath a first one of said cross bars of said chain to underlie the same for removably attaching said pusher in an upright position on said chain, and said projection being of a length sufficient to extend rearwardly along said chain to abut a second one of said cross bars immediately behind said first one of said cross bars for transmitting the movement of said chain to said pusher.

4. An automobile pusher for a car washer or the like having a chain movably disposed along the floor of said washer and including cross bars spaced apart along said chain, comprising a rigid body having a front face portion and a bottom portion with said portions disposed at a right angle to each other and with said bottom portion extending along and on top of said chain, a resilient member attached to said face portion of said body and being disposed thereon for pushing on the automobile rear bumper when said pusher is attached to said chain, a projection depending from said bottom portion at the end thereof adjacent said face portion and having a toe portion extending forwardly thereon with respect to said chain movement and extending from the bottom of said projection and being of a forward extent sufficient for being disposed beneath a first one of said cross bars of said chain to underlie the same and being of a width substantially equal to that of said face portion for laterally supporting said pusher in an upright position on said chain, and said projection being of a length sufficient to extend rearwardly along said chain from said first one of said cross bars to abut a second one of said cross bars immediately behind said first one of said cross bars for transmitting the movement of said chain to said pusher, and said projection having a heel portion on the rear end thereof opposite said toe portion and with said heel portion being curved for pivotal movement past said second one of said cross bars upon attaching and detaching said pusher with respect to said chain.

References Cited in the file of this patent

UNITED STATES PATENTS

| | | |
|---|---|---|
| 1,428,679 | Caswell | Sept. 12, 1922 |
| 1,740,014 | Hawkins | Dec. 17, 1929 |
| 2,100,253 | Irwin et al. | Nov. 23, 1937 |